No. 833,246. PATENTED OCT. 16, 1906.
W. W. RUBLE.
HEADLIGHT ATTACHMENT FOR RAILWAY CARS, &c.
APPLICATION FILED FEB. 2, 1906.
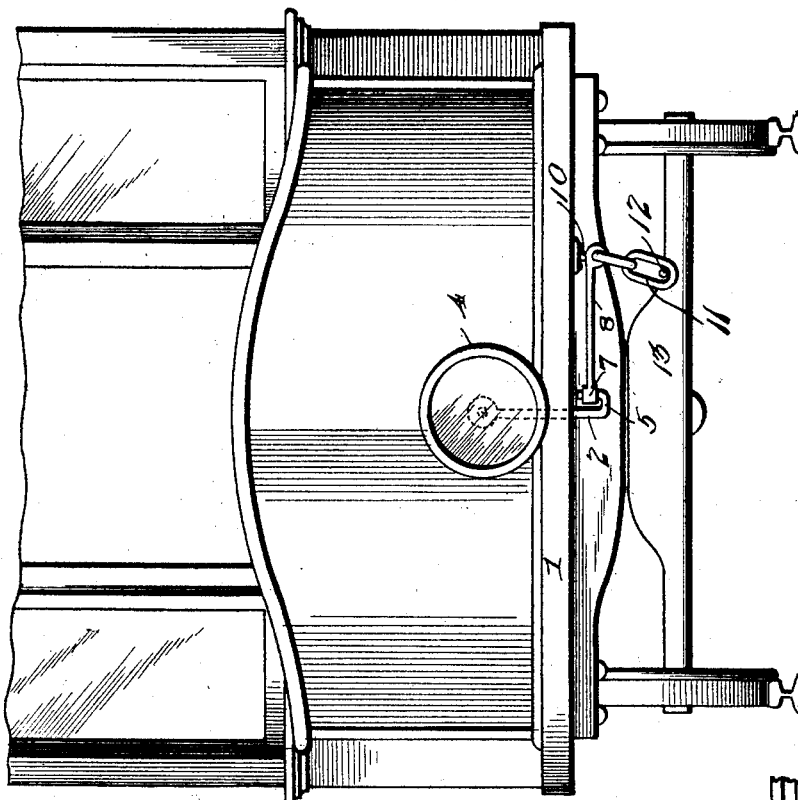
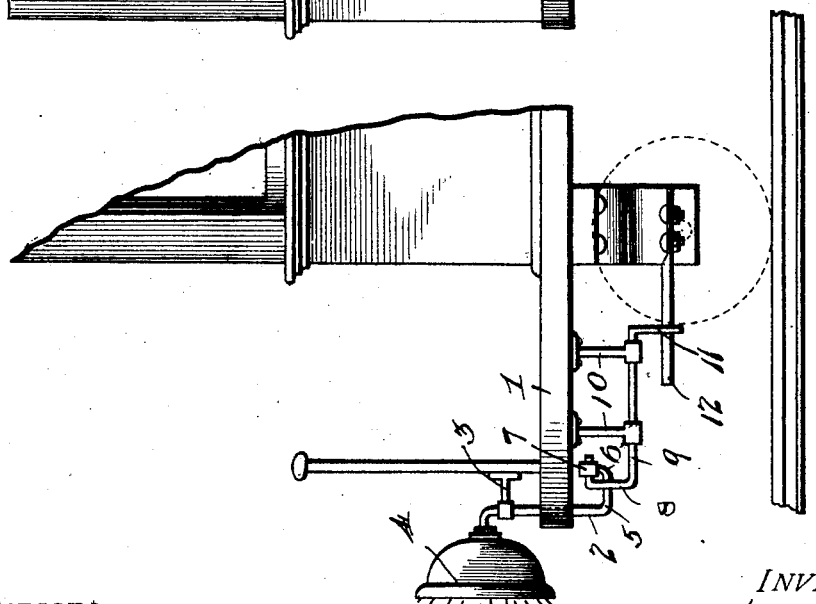
WITNESSES:
INVENTOR
Wesley W. Ruble
BY Geo. S. Vashon
Attorney

UNITED STATES PATENT OFFICE.

WESLEY W. RUBLE, OF SAN JOSE, CALIFORNIA.

HEADLIGHT ATTACHMENT FOR RAILWAY-CARS, &c.

No. 833,246.  Specification of Letters Patent.  Patented Oct. 16, 1906.

Application filed February 2, 1906. Serial No. 299,113.

*To all whom it may concern:*

Be it known that I, WESLEY W. RUBLE, a citizen of the United States, residing at San Jose, in the county of Santa Clara and State of California, have invented new and useful Improvements in Headlight Attachments for Railway-Cars, &c., of which the following is a specification.

This invention relates to a movable headlight attachment for railway-cars, automobiles, locomotives, and vehicles generally upon which a headlight might be used; and the primary object of the same is to provide an attachment controlled as to its adjustment by the corresponding movement of the running-gear and body of the vehicle in rounding curves or turning, whereby the headlight may be regularly positioned with respect to the center of the body and cast light ahead, so that the driver or person in control of the vehicle may be enabled to readily discover objects or persons in the direct path of movement of the vehicle. Inconvenience arises in rounding curves by having the light thrown at a tangent to the path of movement of the vehicle, as when a headlight is fixed.

The invention consists in the construction and arrangement of the several parts, which will be more fully hereinafter set forth.

In the drawings, Figure 1 is a side elevation of a portion of a vehicle embodying the features of the invention. Fig. 2 is a front end elevation of the same.

In the accompanying drawings the headlight is shown applied to the front of a railway-car; but it will be understood that it can be practically used on any other vehicle, as heretofore indicated.

The numeral 1 designates a platform or body in the front central portion of which a vertical staff 2 is movably mounted and held in position by a bracket 3, secured to a part of the body. On the upper extremity of the staff 2 a headlight 4 of any suitable construction is secured. The lower extremity of the staff 2 projects under the body 1 at an angle, as at 5, and has an upright terminal serving as a post 6, with which a vertical socket 7 on the free end of a crank-arm 8 engages. The crank-arm 8 projects from a rock-shaft 9, which is held in suitable hangers 10, depending from the under side of the body 1 and extends under the latter. The rear extremity of the rock-shaft 8 is formed as a depending loop or eye 11, which loosely engages with a forwardly-projecting actuating-bar 12, rigidly secured to the running-gear 13, to one side of the center of the latter, as clearly indicated by Fig. 2.

The loop or eye 11 is of such dimensions with respect to the actuating-bar 12 that the vibration or inequality of movement of the running-gear does not in the least affect the remaining parts of the attachment, and particularly the rock-shaft 9, and hence the strength and durability of the attachment is not in the least impaired, and consequently can be constructed of light material and of a small number of parts. Furthermore, it will be seen that the attachment requires very few additional parts to place it in operative position with respect to a vehicle-body, the additional parts consisting, mainly, of the brackets 3, hangers 10, and the means for securing the actuating-bar 12.

The operation of the improved attachment is very simple. When the vehicle swings around a curve or changes its direction of movement from a straight line, the body assumes a certain angle with respect to the running-gear, which is reversed in accordance with the movement of the vehicle in either a right or left direction, as will be readily understood. This change of angle of the body with respect to the running-gear causes the actuating-bar 12 to correspondingly pull on the eye or loop 11 of the rock-shaft 9 and rotate said shaft, the rotation of this shaft being transmitted through the arm 8 to the lower extremity of the staff 2 of post 6. Hence the headlight 4 will be shifted at a corresponding angle and throw out its rays directly in the center of the path of movement of the vehicle and enable the driver or operator to descry or clearly see any objects or persons which may be in front of the vehicle. The improved attachment has manifold advantages not only on railway-cars, but on other vehicles, as heretofore set forth. When used on railway-cars, the motorman or driver is enabled to clearly see the track, especially where switches are traversed, and it may be readily ascertained by the improved means whether the switches are open or shut and whether all is clear upon the track intended to be traveled. Also upon suburban car-lines with many hills and curves and through tunnels, which are usually more or less curved, the improved attachment will be found useful by shedding or casting the light always in the center of the track and lighting the latter before the car commences to turn.

The small number of parts used and their particular assemblage as set forth will reduce wear to a minimum and obstruct annoyance arising from the use of complex mechanism, which is liable to get out of order. The staff or light post 2 may have the headlight 4 secured thereto in any suitable manner, and it is proposed to construct the several parts of the attachment of any suitable material, preferably metal.

What I claim is—

The combination with a vehicle-body and a running-gear therefor, of a rotatable light-post vertically disposed in the body and carrying a headlight on its upper extremity, the lower extremity of said post having a laterally-deflected horizontal portion terminating in a vertical post, a rock-shaft held against the under side of the body and having a laterally-extending arm at its forward extremity provided with a sleeve secured over the said vertical post and its rear extremity depending at an angle and formed as an enlarged eye, and an actuating-bar rigidly secured to the running-gear of the vehicle and loosely passing in a forward direction through the said enlarged eye of the rock-shaft.

In testimony whereof I affix my signature in presence of two witnesses.

WESLEY W. RUBLE.

Witnesses:
  AARON LATSHAW,
  MAY J. LIDDLE.